(12) United States Patent
Griebel et al.

(10) Patent No.: US 7,748,733 B2
(45) Date of Patent: Jul. 6, 2010

(54) METHOD OF MANUFACTURING OF AN AT LEAST TWO-PART INTERIOR LINING COMPONENT OF AN AUTOMOTIVE VEHICLE, WITH INTEGRATED AIRBAG COVER, AND INTERIOR LINING COMPONENT OF AN AUTOMOTIVE VEHICLE

(75) Inventors: Martin Griebel, Jena (DE); Walter Lutze, Drackendorf (DE); Thomas Schadeberg, Jena (DE); Marcus Marre, Jena (DE); Frank Seidel, Jena (DE)

(73) Assignee: Jenoptik Automatisierungstechnik, Jena (DE)

( * ) Notice: Subject to any disclaimer, the term of this patent is extended or adjusted under 35 U.S.C. 154(b) by 69 days.

(21) Appl. No.: 12/048,862

(22) Filed: Mar. 14, 2008

(65) Prior Publication Data

US 2008/0224455 A1    Sep. 18, 2008

(30) Foreign Application Priority Data

Mar. 15, 2007    (DE) ........................ 10 2007 013 108

(51) Int. Cl.
*B60R 21/20* (2006.01)
(52) U.S. Cl. .................................................. 280/728.3
(58) Field of Classification Search .............. 280/728.3; 219/121.68, 121.69, 121.7, 121.71; 264/400
See application file for complete search history.

(56) References Cited

U.S. PATENT DOCUMENTS 5,882,572 A    3/1999    Lutze et al.
6,113,131 A    9/2000    Uehara et al.
6,294,124 B1   9/2001    Bauer et al.
7,000,942 B2   2/2006    Lutze et al.
7,121,578 B2   10/2006   Cowelchuk et al.
2005/0134023 A1 6/2005   Cowelchuk et al.

FOREIGN PATENT DOCUMENTS

| DE | 198 19 573 A1 | 11/1998 |
|---|---|---|
| DE | 102 27 118 A1 | 1/2004 |
| DE | 10 2004 047 634 A1 | 8/2005 |
| DE | 10 2006 054 592 B3 | 2/2008 |
| EP | 0 711 627 A2 | 5/1996 |
| EP | 0 967 066 A2 | 12/1999 |
| EP | 0 827 802 B1 | 5/2000 |
| EP | 0 967 066 B1 | 11/2003 |
| WO | WO 99/01317 | 1/1999 |

*Primary Examiner*—Faye M. Fleming
(74) *Attorney, Agent, or Firm*—Duane Morris LLP

(57) ABSTRACT

An interior lining component of an automotive vehicle and method of making same having a support layer and a decorative layer. The decorative layer is joined, either indirectly via an intermediate layer or directly, to the support layer. A series of alternating slits and bridging elements are formed in the support layer along a desired predefined tear seam line. Blind holes of a predefined residual wall thickness and/or microperforation holes extend into the decorative layer along the predefined tear seam line in the region of the bridging elements and in the region of the slits so that the spacing between the holes in the slit regions is narrower than the spacing in the bridging element regions.

9 Claims, 1 Drawing Sheet

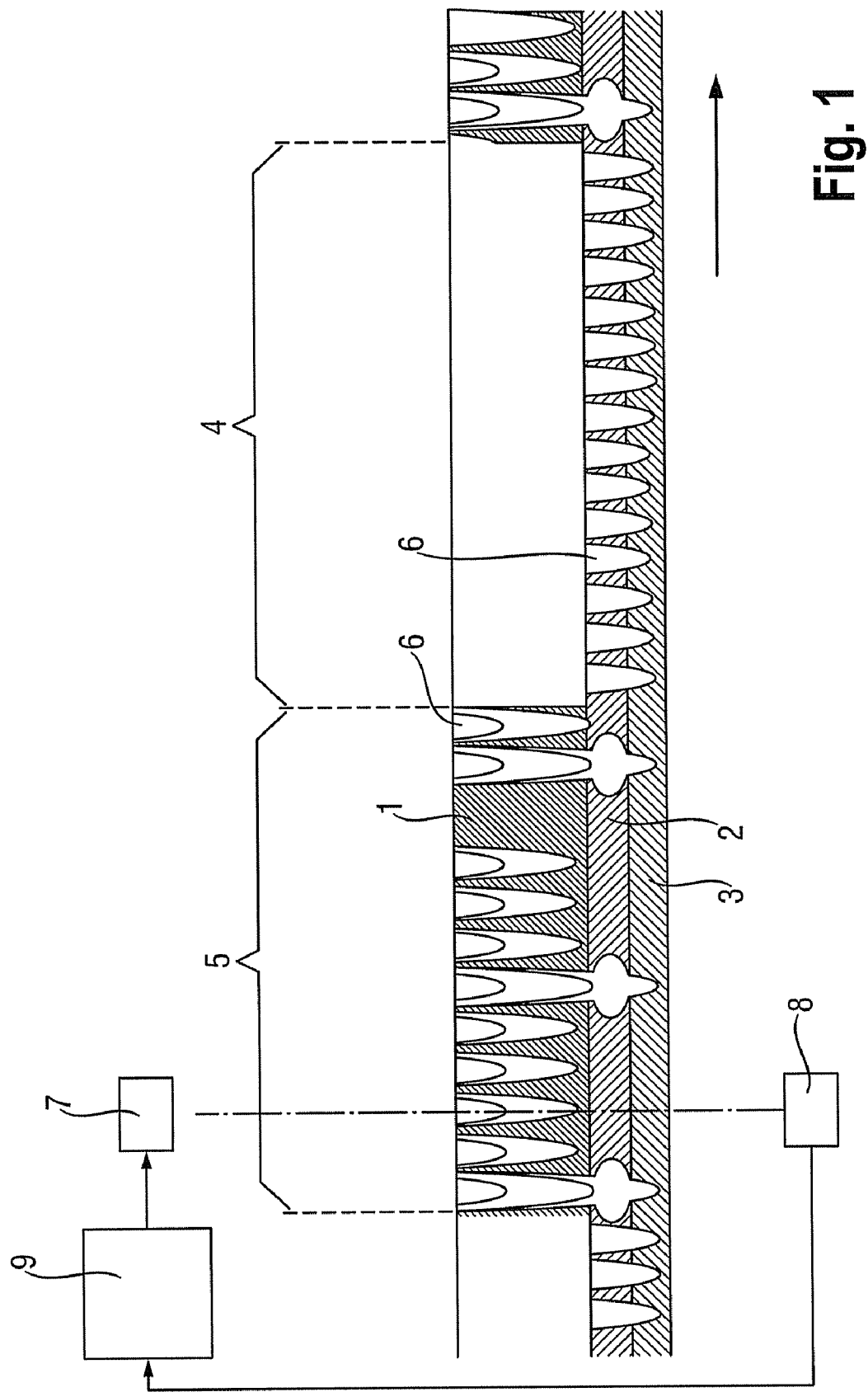

METHOD OF MANUFACTURING OF AN AT LEAST TWO-PART INTERIOR LINING COMPONENT OF AN AUTOMOTIVE VEHICLE, WITH INTEGRATED AIRBAG COVER, AND INTERIOR LINING COMPONENT OF AN AUTOMOTIVE VEHICLE

FIELD

The subject matter of the present invention relates to a method of manufacturing an at least two-part interior lining component of an automotive vehicle with integrated airbag cover comprising at least one opening flap, the contour of which opening flap is determined by a predefined tear seam line that has been produced by means of a laser.

The subject matter of the present invention also relates to an interior lining component of an automotive vehicle, which component has been manufactured using a method according to the present invention.

BACKGROUND

In higher-quality automotive vehicles, interior lining components, such as instrument boards or steering wheel caps behind which an airbag module is stored, are frequently made of several layers. Generally, the lowermost layer that faces the airbag module is a rigid support layer which gives the lining component its shape, in most cases made of a plastic material, e.g., polypropylene (PP) with or without fiberglass reinforcement, or a wooden molding material manufactured by means of a primary shaping method or by means of a reshaping method. This support layer, either indirectly via an intermediate layer or directly, is joined to a decorative layer.

The intermediate layer and the decorative layer serve to impart an overall visual and tactile texture indicative of the standard of the automotive vehicle involved.

The intermediate layer is a soft, compressible layer of low density, e.g., made of an expanded plastic material or a fiber knitted fabric.

As a rule, the decorative layer is a firm, wear-resistant layer and can be made of a plastic material, e.g., thermoplastic polyolefin (TPO), polyurethane (PU) or polyvinyl chloride (PVC), leather or a textile material.

The selection of the type of material to be used for each layer is mainly based on esthetic considerations.

To ensure that on deployment of the airbag module, an opening is reliably formed, through which opening the airbag can inflate without obstruction into the passenger compartment, a predefined tear seam line is produced, according to the prior art, in the lining component of the automotive vehicle by means of local removal of material, the outline of which predefined tear seam line describes one or more opening flaps that form the airbag cover.

In case of emergency, it must be possible to rupture this predefined tear seam line by applying an as low as possible reproducible defined bursting force. At the same time, the airbag cover should be able to offer the airbag module mechanical protection against any spontaneous shock that is not related to an accident, which is the reason why the necessary bursting force should not fall below a certain minimum.

In addition to these technical requirements, the predefined tear seam line should also meet certain esthetic requirements in that it remains invisible to the passengers even in the long term.

Predefined seam tear lines known in the prior art are formed by a continuous groove or a sequence of grooves or holes (blind holes or microperforation holes) or combinations of these. The depth to which material is removed may be uniformly constant or may vary along the length of the predefined tear seam line following a certain pattern.

In the explanations below, the term "pre-weakened line" will be used to describe linear material removal in only one layer of the material. A predefined tear seam line is formed by superimposing the pre-weakened lines in separate layers in the final layered structure of the interior lining component of the automotive vehicle, one on top of the other.

To create a pre-weakened line in the decorative layer, the above-mentioned types of predefined tear seam lines are used while the pre-weakened line in the support layer can also be formed by slits or through bores.

The fact that there are such a large number of patents that attempt to solve the problem of producing such a predefined tear seam line is evidence of the technical difficulties developers are facing when tackling this task. These technical difficulties are attributable especially to the different physical properties of the layered structure, which properties make it especially difficult to machine all of the layers in the same manner.

Based on the sequence of the process steps, manufacture of the layered structure and production of the predefined tear seam line, it is possible to divide the prior art methods into three groups:

Separate production of a pre-weakened line in the support layer and in the decorative layer and subsequent joining of the layers to create the layered structure of the composite component Production of a pre-weakened line in the form of a gap or slit in the support layer, joining of the layers to create the layered structure and production of a pre-weakened line in the decorative layer through the gap or slit Joining of the separate layers to create the layered structure and production of a predefined tear seam line In the method of the first mentioned group, pre-weakened lines are produced separately in the support material and in the decorative material. In this case, it is possible to choose different technological methods or different process parameters specifically suitable for each material. The problem encountered in this type of method is that the two pre-weakened lines must be produced so as to be congruent and must be joined so as to be exactly on top of each other in order to jointly form a predefined tear seam line of defined bursting force.

European Patent 0 711 627 A1 describes this type of method in which the pre-weakened line in the decorative layer is produced by means of a laser. It mentions that the depth of the groove must be carefully controlled in order to cause the decorative layer to rupture at precisely the right moment.

A method of the second above mentioned group is known from European Patent EP 0 967 066 B1. In this case, the support layer, is produced with a gap being integrated along the predefined tear seam line desired, with said gap possibly being interrupted by bridging elements. Subsequently, the support layer is joined indirectly or directly to the decorative layer, and the decorative layer is weakened through the gap. Tools mentioned as being suitable for this purpose are a laser, a mechanical knife, ultrasound, a hot knife or a water jet.

It is claimed that the special advantage of such a solution as compared to the third mentioned group of methods is the simultaneous formation of the gap during the manufacture of the support layer, which is said to make the subsequent step of removing material from the support layer superfluous. The advantages claimed are that the cycle time can be reduced, that a low-energy laser can be used, and that it is not necessary to take measures to handle the by-products that form during the evaporation of the support material.

Compared to the first group of methods, the advantage is that the decorative layer can be joined to the support layer, without having to align previously separately produced pre-weakened lines with respect to each other. Weakening the decorative layer through a gap existing in the support layer ensures that the two pre-weakened lines, which form the predefined tear seam line, in the support layer (produced by the gap) and in the decorative layer (produced by a sequence of holes) are congruent with respect to each other.

As in the first group of methods mentioned above, the laser parameters can be selected so as to be optimally suitable for the material of the decorative layer.

Bridging elements that bridge the gap are mentioned in European Patent EP 0 967 066 B1 as not being absolutely necessary but only as being useful. Such bridging elements can be incorporated while profiling the support layer comprising the gap or they can be attached to the support layer later so that they bridge the gap. The bridging elements are intended to stabilize the opening flap outlined by the gap against the surrounding support layer.

In the absence of bridging elements that bridge the gap, additional measures must be taken to protect the predefined tear seam line against accidental destruction due to spontaneous shock that is not related to an accident but instead is generated inside the passenger cabin. No information about such measures is provided.

When the slit is formed with bridging elements that bridge the gap, the decorative layer underneath the bridging element is by necessity not weakened if, as is the case here, a pre-weakened line is produced only in the slit regions. This can lead to uncontrolled tearing in the decorative layer if the predefined tear seam line in the unweakened regions below the bridging elements in the support layer is ruptured.

In the third group of methods mentioned, a predefined tear seam line is formed in the already prefabricated layered structure of an interior lining component from the side of the support layer. A tool especially suitable for this purpose was found to be a pulsed laser with its controllable laser parameters, pulse amplitude, pulse width and pulse frequency since it is possible, by way of changing many of the process parameters, to influence the effect of such a laser in a manner specifically suitable to the material used, without having to change tools. It is, however, also possible to use a continuous laser if the energy of the laser is appropriately modulated.

Only in exceptional cases is it possible to use constant laser parameters for all layers when machining a layered structure, such as it is commonly used for interior lining components.

In most cases, the laser energy required to penetrate through the support layer within a reasonable time would be far too high to maintain a possibly existing intermediate layer as intact as possible and to weaken the decorative layer so that only a minimum residual wall thickness remains. To ensure that the quality of the predefined tear seam line meets all demands, the laser parameters must be adjusted, via the depth to which material is removed, to the properties of the individual successive layers of the layered structure.

The depth to which material is removed and/or the residual wall thickness, at least in cases in which the depth to which material is removed extends into the decorative layer, is/are preferably monitored to ensure that a complete through penetration of the decorative layer is reliably avoided (except for visually imperceptible microperforation holes), thus ensuring that invisibility is maintained.

This type of method is described in European Patent EP 0 827 802 B1.

To carry out the method according to European Patent EP 0 827 802 B1, a laser beam—the pulse amplitude, pulse width and pulse frequency of which can be controlled—is directed at the layered structure from the side of the support layer. Underneath the layered structure, a sensor, which is oriented in the direction of the laser beam, is disposed on the side of the decorative layer, which sensor detects the portion of the radiation energy of the laser beam that is transmitted through the layered structure. The parameters of the detector and of the laser radiation source are coordinated with each other so that a first signal is detected when the support layer in the area exposed to the laser beam is completely removed. This assumes that the layers following the support layer are partly transparent for the wavelength of the machining laser beam.

Machining the layered structure begins with a pulse type with high pulse energies, which makes it possible to rapidly penetrate through the support layer. As the first laser beam is detected, which is possible after the complete through penetration of the support layer, the pulse type is changed in order to adjust it to the properties of the layer of the expanded plastic material and the decorative layer that determine the removal of material by the laser. Specifically, the pulse duration is shortened, which ensures lower thermal stress and gentle material removal.

European Patent EP 0 827 802 B1 shows that it was recognized as early as 1998, i.e., at the time of the present patent application, that it is possible, using a suitable laser regimen, to weaken a layered structure comprising materials with different physical properties and different layer thicknesses along a predefined tear seam line in a reproducible and predefined manner so that said predefined tear seam line can be ruptured by means of a predefined bursting force.

As practical experience has demonstrated, however, especially intermediate layers, which can be exposed to low thermal stress only, can be removed over large surface areas to the point that they disappear completely along the predefined tear seam line once the support layer has been pierced, even when the exposure to laser energy high enough to machine the support layer is of short duration only. The decorative layer, which is subsequently no longer supported along the predefined tear seam line, collapses—regardless of whether the pre-weakened line in the decorative layer is formed by blind holes or microperforation holes jointly referred to as holes)—and becomes visible.

An increase in the spacing between the holes along the entire length of the predefined tear seam line to ensure that a supporting bridging element is securely maintained between the holes in the intermediate layer would excessively increase the required bursting force.

It will be obvious to the person skilled in the art that the effect will be the same if, instead of a soft intermediate layer and a thin compact decorative layer, a decorative layer is used, which combines the function of the conventional intermediate and decorative layers mentioned.

German Patent DE 198 19 573 A1 discloses an instrument panel on which, along the length of a predefined tear seam line, blind holes are formed by means of a laser, which blind holes completely penetrate through a support layer and a superimposed intermediate layer and end within the outer decorative layer. A preformed groove can be present along the predefined tear seam line in the support layer.

In contrast to the patent just mentioned above, in the method disclosed in German Patent DE 102 27 118 A1, the energy input for the individual blind holes is periodically varied so as to obtain, on the one hand, blind holes which penetrate only into or through the support layer and, on the other hand, extend into the decorative layer. As a result, bridging elements that serve to support the superimposed decorative layer are retained in the intermediate layer.

German Patent DE 10 2004 047 634 A1 discloses an instrument panel having the same layered structure as well as a method of producing said instrument panel, with a predefined tear seam line made of blind holes of different residual wall thickness.

International Publication WO 99/01317 A1 also describes an airbag cover and a method of manufacturing it, which method, like the ones disclosed in the documents mentioned above, uses a laser to machine holes into a layered structure comprising a support layer, an intermediate layer and a decorative layer. The holes can extend to varying depths and, in this case, sometimes even completely penetrate through the decorative layer.

In all of the documents mentioned, a support layer is not only present [sic] along the desired predefined tear seam line but, in its thickness, is also constant along its length, or at least along the length of the sections that are to be weakened.

SUMMARY

A problem sought to be solved by the present invention is to make available an additional method by means of which a reproducible predefined tear seam line of a predefined bursting force can be machined into an interior lining component of an automotive vehicle, comprising a support layer and a decorative layer that is joined directly or indirectly via an intermediate layer. The predefined tear seam line is visually not perceptible from the side of the decorative layer. Specifically, this method is to be especially suitable for an interior lining component of an automotive vehicle comprising a thermally highly sensitive intermediate layer.

Another problem sought to be solved by the present invention is to make available an interior lining component of an automotive vehicle, in particular comprising a thermally highly sensitive intermediate layer, in which component the predefined tear seam line outlining the airbag cover is not visually perceptible.

These problems are solved by a method of manufacturing an interior lining component of an automotive vehicle comprising a minimum of two layers and having an integrated airbag cover and by an interior lining component of an automotive vehicle having a support layer and a decorative layer, which latter is joined indirectly via an intermediate layer or directly to the support layer, said support layer representing [sic; having] a series of alternating slits and bridging elements along a desired predefined tear seam line, characterized in that along the predefined tear seam line in [the region of] the bridging elements and in [the region of] the slits, blind holes of a predefined residual wall thickness and/or microperforation holes extending into the decorative layer are present and that the spacing between the holes in the slit regions is narrower than the spacing in the bridging element regions. Useful embodiments are described in the dependent claims.

BRIEF DESCRIPTION OF THE DRAWINGS

The invention will be described in greater detail by means of an example illustrated in the annexed drawing, in which:

FIG. 1 shows a schematic cross-sectional view through an interior lining component of an automotive vehicle along a predefined tear seam line.

DESCRIPTION OF THE EMBODIMENTS

To manufacture an interior lining component of an automotive vehicle according to the present invention, said component having a support layer 1 and a decorative layer 3, which latter is joined either directly or indirectly via an intermediate layer 2 to the support layer 1, first the support layer 1 which imparts shape and rigidity to the interior lining component of an automotive vehicle is manufactured. This support layer can be manufactured, for example, from a plastic material, e.g., polypropylene (PP) with or without a fiberglass reinforcement, or a wooden molding material. The support layer 1 is preferably manufactured by means of a primary shaping method or by means of a reshaping method, during which slits 4 are already incorporated along the planned pre-weakened line. The pre-weakened line runs along the periphery of one or more opening flaps that form an airbag cover. To ensure that the part of the support layer 1 forming the airbag cover is stable with respect to the surrounding remainder of the support layer 1, one must choose a suitable ratio between the slit lengths and the lengths of the bridging elements remaining between said slit length, said ratio being determined by the properties of the support material and the thickness of the support layer, with the slit lengths being greater than the lengths of the bridging elements.

It is also possible to machine the slits 4 later into the support layer 1, the shape of which is otherwise finished.

After all slits have been machined into support layer 1, the decorative layer 3 is directly, or indirectly via an intermediate layer 2, joined to the support layer 1. The intermediate layer 2 can be made, e.g., of an expanded plastic material or a knit spacer fabric which serves to make the surface of the interior lining component that is formed by the decorative layer 3 look and feel soft. Materials suitable for the decorative layer 3 include in particular plastic sheeting materials, leather and textile materials.

The method according to the present invention can also be used when the decorative layer 3 is joined directly to the support layer 1, and in particular when a decorative layer 3 is used, which combines the described properties of conventional intermediate layers and decorative layers. In addition, there may be more than one intermediate layer 2 between the support layer 1 and the decorative layer 3.

In the practical example described, the support layer of the interior lining component of an automotive vehicle comprises the support layer 1, the intermediate layer 2 and the decorative layer 3, with the support layer 1 having a series of slits 4 and bridging elements 5 in the region of the predefined tear seam line.

FIG. 1 shows a schematic cross-sectional view of the layered structure of such an interior lining component of an automotive vehicle along a predefined tear seam line, wherein for clarity's sake, the components are not shown to scale.

To create a predefined tear seam line which meets the requirements that it should not be visually perceptible and should have a low, defined and reproducible bursting force and which at the same time ensures, via the predefined tear seam line, a sufficient stabilization of the airbag cover with respect to the surrounding part of the support layer 1, the decorative layer 3 is to be weakened across the bridging elements and slit regions by holes (blind holes or microperforation holes), using a laser 7, the spacing between said holes being chosen to ensure that a supporting bridging element is maintained in the intermediate layer 2.

As already explained in the discussion of the prior art, the laser parameters must be adjusted to the material properties of the individual layers so as to ensure that the result after the removal of material is as desired.

This is of special importance when machining the bridging element region in the transitional boundary region between the support layer 1 and the intermediate layer 2.

Since, due to the inhomogeneities of the materials and the unavoidable fluctuations of the laser parameters, it is not possible to predict with any precision when the depth to which material should be removed has reached this transitional boundary region from one layer to the next, it is possible to adjust the laser parameters on reaching this transitional boundary region only if said transitional boundary region between the layers is recognized, e.g., by the detection of transmitting radiation according to European Patent EP 0 827 802 B1, which, however, assumes that the intermediate layer 2 and the decorative layer 3 are to a certain degree transparent.

In the practical example described, it will be assumed that the decorative layer 3 has, if any, only a low transparency for the laser beam so that a sensor, which, in the direction of the laser beam, is beyond the decorative layer 3, detects a portion of the radiation energy only when the remaining residual wall thickness underneath the produced blind hole approaches zero and/or when a microperforation hole is produced in the decorative layer 3.

If, after the laser beam has completely penetrated through the support layer 1, it impinges at an excessively high energy on the intermediate layer 2, excessive and, in particular, non-reproducible erosion of the intermediate layer 2 around the hole that is forming results. To ensure that a supporting bridging element is maintained in the intermediate layer 2, if the formation of the hole takes place through the support layer and the intermediate layer 2 into the decorative layer 3, the spacing between the holes must be chosen to be wider than if the formation of the hole takes place only through the intermediate layer 2 into the decorative layer 3.

When machining the slit region, the laser parameters can, from the very beginning, be optimally adjusted to the intermediate layer 2, which allows erosion of the intermediate layer 2 around the holes to be avoided to the extent possible. The spacing between the holes, for holes that extend into the decorative layer 3, can therefore be chosen to be considerably smaller.

To insert holes via the slits 4 (slit regions)—in which case the laser 7 must pass only through the intermediate layer 2 to penetrate into the decorative layer 3—and via the bridging elements 5 (bridging element regions)—in which case the laser 7 must first penetrate through the support layer 1 before it is able to pass through the intermediate layer 2 to penetrate into the decorative layer 3—different laser regimens must therefore necessarily be used for the formation of the holes.

A laser regimen is defined by predefined pulse sequences of the laser beam used to form a hole and by the laser cutoff period which, as a function of the machining speed, determines the spacing between the holes.

As a rule, the pulse sequences are one or several groups of pulses that operate one directly after the other, but they can also be a sequence of different individual pulses. A group of pulse sequences is a number of pulses of identical pulse amplitude and pulse width with a certain pulse frequency.

To be able to produce varying hole spacings, the laser cutoff period is freely choosable and variable, both for the first laser regimen for machining the slit regions and for the second laser regimen for machining the bridging element regions.

It is an essential feature of the invention that the holes in the slit regions be produced with an identical pulse sequence (indicator pulse sequence 6) and that the formation of each individual hole in the bridging element regions begin with this pulse sequence.

To form the holes in bridging element regions, the indicator pulse sequences 6 can be followed by randomly choosable pulse sequences so as to produce different depths to which the material is removed.

In particular, to ensure a reproducible weakening of the material and thus a reproducible bursting force along the predefined tear seam line, it is essential that along the transitional boundary regions between bridging elements 5 and slits 4 and/or slits 4 and bridging elements 5, the first laser regimen and the second laser regimen be reliably alternated.

Since each hole formation begins with the indicator pulse sequence 6, these transitional boundary regions are detected, without additional measures being required, by means of the laser regimen itself, which is essential to the method according to the present invention.

In the practical example described next, it will be assumed that the predefined tear seam line begins in a slit region, i.e., the laser machining head is positioned above the site of a first hole to be generated in the slit region.

It is useful to begin in the slit region since here each hole is cut with an identical pulse sequence, i.e., the indicator pulse sequence 6, and thus a predefined machining operation takes place, regardless of the exact point in the slit region.

According to the first practical example, the holes in the slit region are generated with an indicator pulse sequence 6 which constitutes a group of pulse sequences of, e.g., fifteen consecutive pulses of type 1 with a predefined pulse frequency of identical pulse amplitude and identical pulse width so as to produce blind holes of a predefined residual wall thickness and/or microperforation holes in the slit region.

When using the indicator pulse sequence 6 to produce the individual holes in the slit region, a laser energy penetrating the decorative layer 3 must be detected at the latest after the fifteenth pulse by a detector 8 which, in the direction of the laser beam, is beyond the decorative layer 3. The reception of a detector signal serves as a criterion for deciding whether the indicator pulse sequence 6 was in fact used to produce a hole in the slit region.

This means that as long as the indicator pulse sequence 6 is in fact used in the slit region, the detector 8 will detect radiation energy, at the latest, after completion of the fifteenth pulse. The detector 8 subsequently transmits a signal to a control device 9 which switches the laser 7 off.

If no signal is detected at the end of the fifteenth pulse, this indicates that the laser 7 is not located within the slit region but within a bridging element region. In this case, the control device 9 subsequently switches to the laser regimen for bridging element regions, which regimen serves to produce holes in the bridging element region.

The laser regimen provided for machining bridging element regions, preferably produces a combination of blind holes and perforation holes. In the practical example, one perforation hole is followed by four blind holes. Blind holes are produced only by pulse sequence groups with pulses of type 1 and type 2 and, after completion of the pulse sequence groups, preferably end in the boundary region between the support layer 1 and the intermediate layer 2. Thus, in the bridging element region, only every fifth hole extends into the decorative layer 3, with a bridging element remaining in between, even if the support layer around this hole erodes over a large surface area.

The hole that extends into the decorative layer 3 is produced with pulse sequence groups of pulses of type 1, type 2 and type 3. The pulses of type 2 that follow after pulse type 1 have a higher energy than type 1 and serve to rapidly machine the support material. The pulses of the final pulse type 3 have a lower energy and make it possible to gently machine the intermediate layer 2 and the decorative layer 3. In this case again, the laser 7 is switched off when pulses of type 3 generate a signal in the detector 8.

As soon as the laser 7 has reached the position in which the next hole is to be produced, it is switched on again.

It is also possible to machine the bridging element region without blind holes, in which case the spacing between the perforation holes is chosen to be appropriately wider.

Other combinations of blind holes and perforation holes with blind positions can also be used, in which case stabilizing bridging elements remain in the support layer. For this purpose, there is a single predefined laser cutoff period.

Using the method described, it is possible to detect the transitional boundary regions between the bridging element 5 and the slit 4 and/or between the slit 4 and the bridging element 5 during the machining operation without requiring additional means, and to use a received detector signal to control the laser regimen so as to produce a reproducible pre-weakened line of predefined bursting force.

LIST OF REFERENCE NUMERALS USED

1 Support layer
2 Intermediate layer
3 Decorative layer
4 Slit
5 Bridging element
6 Indicator pulse sequence
7 Laser
8 Detector
9 Control device It will be obvious to the person skilled in the field of this invention that the invention is not limited to the details of the above embodiments described by way of examples but that the present invention can be embodied in other special forms without deviating from the scope of the invention which is defined by the following claims.

The invention claimed is:

1. A method of manufacturing an interior lining component of an automotive vehicle, said interior lining component having a support layer and a decorative layer, said decorative layer being joined indirectly to said support layer by means of an intermediate layer or directly to said support layer, comprising the steps of:

forming a series of alternating slits and bridging elements along a desired predefined tear seam line in said support layer prior to joining said decorative and support layers, directing a controllable pulsed laser beam along said predefined tear seam line relative to said interior lining component of the automotive vehicle from the side of said support layer, detecting said controllable pulsed laser beam when said predefined tear seam line is penetrated, and producing blind holes of a predefined residual wall thickness and/or microperforation holes in said decorative layer by means of the laser beam along the slits using a first laser regimen, and along the bridging elements using a second laser regimen, wherein each hole formation is begun with an identical indicator pulse sequence of the laser beam, with which indicator pulse sequence laser radiation energy is detected in the slit region at the latest after completion of said indicator pulse sequence, and wherein, when radiation is detected, the first laser regimen, or in the absence of the detection of radiation energy, the second laser regimen is used, which ensures that the laser regimen is automatically changed when the laser has reached the transitional boundary region between the bridging element and the slit and/or between the slit and the bridging element.

2. The method as in claim 1, wherein said indicator pulse sequence constitutes a group of pulses with an identical pulse amplitude, an identical pulse width and pulse frequency.

3. The method as in claim 2, wherein, to form a hole in the bridging element region of the indicator pulse group, pulses of higher energy for the rapid machining of the support layer are followed by pulses of a lower energy for the gentle machining of an optionally existing intermediate layer and the decorative layer, and that said laser is switched off when pulses generate a detector signal.

4. The method as in claim 3, wherein, using the second laser regimen, additional holes, which penetrate only into or only through the support layer, are produced in the bridging element regions between the holes that are produced in the decorative layer.

5. The method as in any one of claim 1, wherein the second laser regimen comprises blind positions for producing stabilizing bridging elements in the support layer.

6. The method as in any one of claim 1, wherein the first laser regimen produces holes more narrowly spaced with respect to one another than the holes produced by means of the second laser regimen.

7. The method as in any one of claim 1, wherein the hole formation begins in the slit region.

8. An interior lining component of an automotive vehicle comprising a support layer and a decorative layer, said decorative layer being joined to said support layer indirectly via an intermediate layer or directly to the support layer, said support layer having a series of alternating slits and bridging elements along a desired predefined tear seam line, wherein along the predefined tear seam line, blind holes of a predefined residual wall thickness and/or microperforation holes extend into said decorative layer in the region of the bridging elements and in the region of the slits and the spacing between said holes in the slit regions is narrower than the spacing in the bridging element regions.

9. The interior lining component of an automotive vehicle as in claim 8, wherein additional holes, which extend only into or only through the support layer are present between the holes in the bridging element region.

* * * * *